United States Patent
Yoshimura

(10) Patent No.: US 6,668,172 B1
(45) Date of Patent: Dec. 23, 2003

(54) RECEPTION APPARATUS AND RECEPTION PROCESSING METHOD

(75) Inventor: Osamu Yoshimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 459 days.

(21) Appl. No.: 09/698,402

(22) Filed: Oct. 27, 2000

(30) Foreign Application Priority Data

Oct. 29, 1999 (JP) .......................................... P11-310323

(51) Int. Cl.[7] ................................................. H04Q 7/20
(52) U.S. Cl. ................. 455/441; 455/238.1; 455/234.1; 455/250.1; 455/232.1; 455/234.2; 455/235.1
(58) Field of Search .......................... 455/232.1, 234.1, 455/238.1, 250.1, 441, 235.1, 234.2

(56) References Cited

U.S. PATENT DOCUMENTS

| | | | | |
|---|---|---|---|---|
| 5,585,805 A | * | 12/1996 | Takenaka et al. | 342/461 |
| 5,787,348 A | * | 7/1998 | Willey et al. | 455/441 |
| 5,844,632 A | * | 12/1998 | Kishigami et al. | 348/706 |
| 5,943,361 A | * | 8/1999 | Gilhousen et al. | 375/142 |
| 6,067,049 A | * | 5/2000 | Moriya | 342/418 |
| 6,249,682 B1 | * | 6/2001 | Kubo et al. | 455/522 |
| 6,373,882 B1 | * | 4/2002 | Atarius et al. | 375/148 |

FOREIGN PATENT DOCUMENTS

| | | | | |
|---|---|---|---|---|
| JP | 403035625 A | * | 2/1991 | |
| JP | 410084313 A | * | 3/1998 | |

* cited by examiner

Primary Examiner—Dwayne Bost
Assistant Examiner—Sujatha Sharma
(74) Attorney, Agent, or Firm—Jay H. Maioli

(57) ABSTRACT

A reception apparatus and a reception processing method are proposed to improve a reception characteristic by compensating deterioration of transmission quality independently of the traveling speed of a terminal. When a transmission signal sent via a radio transmission path is received and data is demodulated by carrying out various kinds of reception processing on the received signal, the present invention can perform reception processing best suited to a radio transmission path whose state changes according to the traveling speed of the terminal itself by receiving traveling speed information from speed detection means for detecting the traveling speed of the terminal itself and controlling reception processing on the reception signal according to the traveling speed information.

12 Claims, 5 Drawing Sheets

RECEPTION APPARATUS AND RECEPTION PROCESSING METHOD

BACKGROUND OF THE INVENTION

1. Field of the Invention

The present invention relates to a reception apparatus and a reception processing method, and more particularly, is suitably applied, for example, to a cellular phone in a digital cellular phone system.

2. Description of the Related Art

In recent years, the market of the mobile communication field is expanding drastically. However, fading is one of the problems specific to a digital cellular phone system using radio.

This fading occurs on a transmission path whose state changes every moment influenced by natural phenomena and structures, etc. When a cellular phone receiving a number of different radio waves is moving, due to a Doppler effect, the frequency of a radio wave coming from ahead increases while the frequency of a radio wave coming from behind decreases and fading is a phenomenon that the reception level fluctuates because the amplitude and phase are distorted when these radio waves are received and combined, which can cause deterioration of transmission quality.

In order to compensate the deterioration of transmission quality due to such fading, in a mobile communication system, a base station on the transmitting side performs, for example, convolution coding on transmission data and rearranges data by interleaving and generates an information symbol group by performing modulation processing on a resultant coding bit string.

Then, the base station adds a plurality of pilot symbols as a header at the start of each frame from the information symbol group and performs filtering processing, digital/analog conversion processing and frequency conversion processing on a resultant transmission symbol group and thereby creates a transmission signal of a predetermined frequency channel and transmits the signal via an antenna to cellular phones.

By the way, the pilot symbol added here is a symbol with a known patter, which is already known to a cellular phone on the receiving side, and the cellular phone can estimate the fading characteristic by comparing the pilot symbol with the known pattern and the pilot symbol of the reception data.

The cellular phone with such a configuration has a fading characteristic, which drastically changes according to the traveling speed, but has been unable to accurately control the fading characteristic according to the traveling speed.

Because of this, the cellular phone cannot execute optimal reception processing for every traveling speed and has a problem of having difficulty in compensating the deterioration of transmission quality due to fading that changes according to the traveling speed and improving the reception characteristic.

SUMMARY OF THE INVENTION

In view of the foregoing, an object of this invention is to provide a reception apparatus and a reception processing method capable of compensating the deterioration of transmission quality independently of the traveling speed and improving the reception characteristic.

The foregoing object and other objects of the invention have been achieved by the provision of a reception apparatus which receives a transmission signal sent via a radio transmission path, carries out various kinds of reception processing on the received signal and demodulates data, can perform optimal reception processing on the radio transmission path whose state changes according to the traveling speed of the terminal itself by receiving traveling speed information from speed detection means that detects the traveling speed of the terminal itself and controlling reception processing on the reception signal according to the traveling speed information.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Overall Configuration of Digital Cellular Phone System

Figure 1:
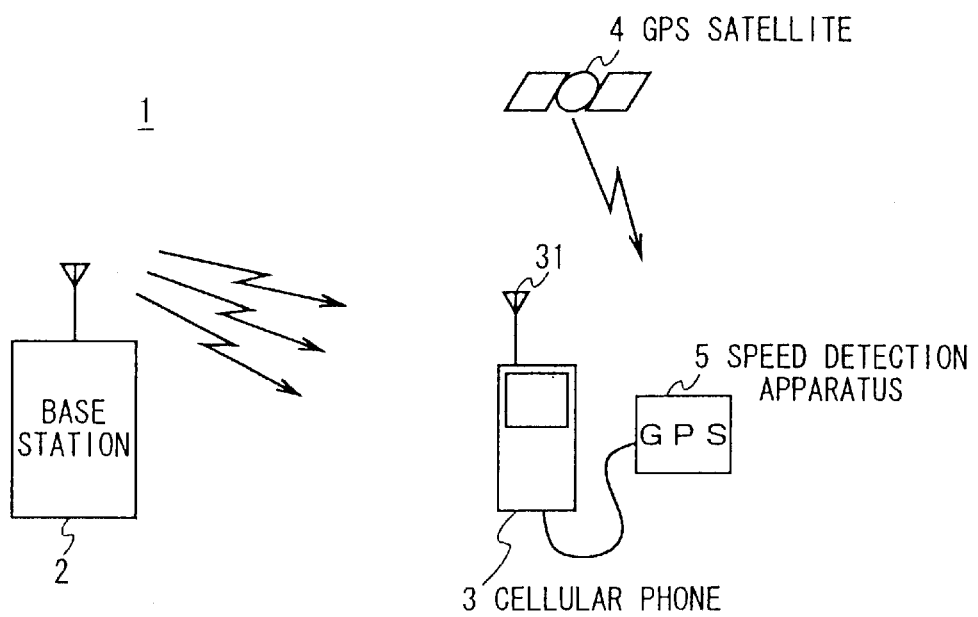
FIG. 1 is a block diagram showing an overall configuration of a digital cellular phone system according to the present invention.

In FIG. 1, reference numeral 1 denotes a whole digital cellular phone system, configured by a base station 2 installed in each of cells into which an area of communication services has been divided and a cellular phone 3 as a mobile station to which the present invention is applied communicating with the base station 2 and the cellular phone 3 is connected with a speed detection apparatus 5 that detects the traveling speed of cellular phone 3 based on a satellite signal received from Global Positioning System (GPS) satellite 4.

Here, in digital cellular phone system 1, the transmitting side divides a predetermined frequency channel temporally into frames of a predetermined time width and divides those frames into time slots of a predetermined time width to transmit a transmission signal. In the following explanations, a time slot assigned for transmission will be called a "transmission slot" and a time slot of a frame obtained by reception will be called a "reception slot."

(1-1) Configuration of Base Station

Figure 2:
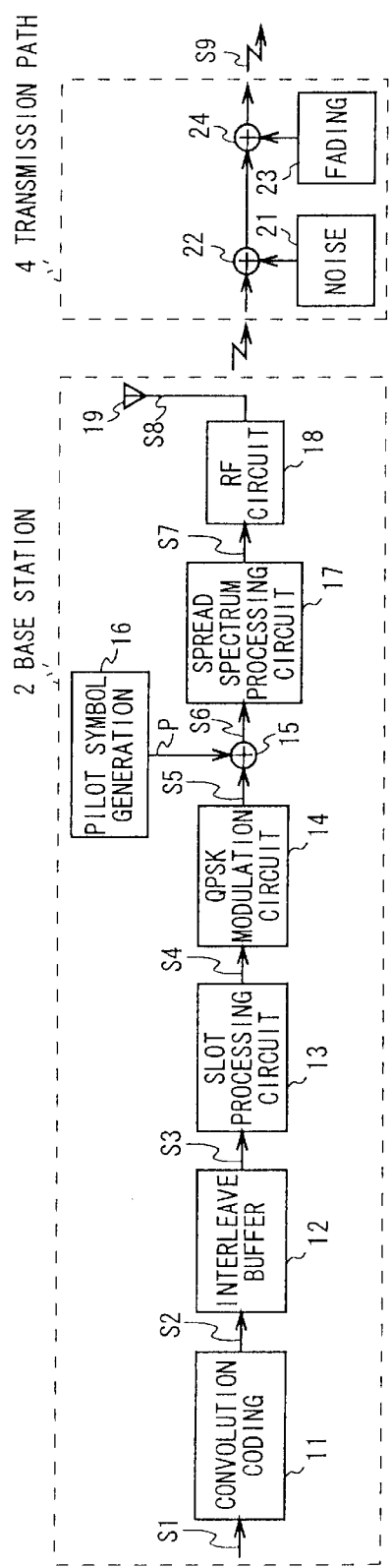
FIG. 2 is a block diagram showing a configuration of a base station.

As shown in FIG. 2, the base station 2 inputs an information bit string S1, which is transmission data, to a convolution coding circuit 11. The convolution coding circuit 11 is configured by a predetermined number of shift registers and exclusive OR circuits, performs convolution coding on the information bit string S1 input and sends a resultant coding bit string S2 to an interleave buffer 12.

The interleave buffer 12 stores the coding bit string S2 from one bit to another in its internal storage area and when the coding bit string S2 is stored in the whole storage area (that is, coding bit string S2 is stored by a desired quantity), the order of coding bit string S2 is randomly rearranged (hereinafter, rearranging the order will be referred to as "interleave") and a resultant coding bit string S3 is sent to a slot processing circuit 13.

By the way, the interleave buffer 3 has a storage capacity corresponding to a plurality of slots so that the coding bit string S3 is distributed to a plurality of transmission slots.

The slot processing circuit 13 divides the coding bit string S3 into a predetermined number of bits in order to assign the coding bit string S3 to the transmission slots and sequentially sends a resultant coding bit group S4 to a Quadrature Phase Shift Keying (QPSK) modulation circuit 14.

The QPSK modulation circuit 14 performs QPSK modulation processing on the coding bit group S4 and sequentially sends a resultant information symbol group S5 to an addition circuit 15.

Figure 3:
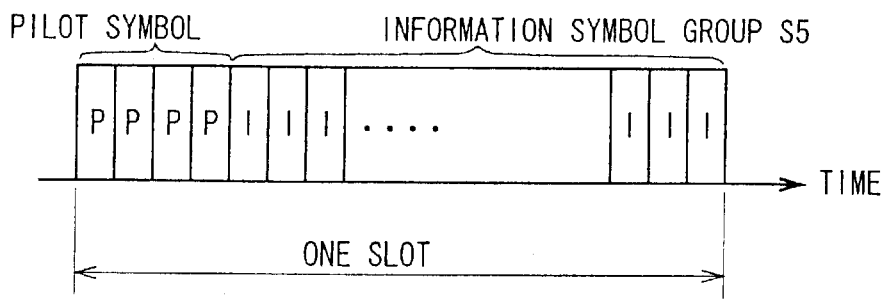
FIG. 3 is a schematic diagram showing a slot format.

As shown in FIG. 3, the addition circuit 15 adds a number of pilot symbols P, for example, 4 symbols, supplied from a pilot symbol generation circuit 16 at the beginning (that is, the beginning of an information symbol I) of the information symbol group S5 classified according to the transmission slot as headers and sequentially sends a resultant transmission symbol group S6 to a spread spectrum processing circuit 17.

Here, the pilot symbol P added as the header is a symbol with a known pattern which is already known to the cellular phone 3 on the receiving side, and the receiving side is designed to be able to estimate the characteristic of the transmission path due to fading, etc. by using the same pilot symbol P as a reference.

The spread spectrum processing circuit 17 performs spread spectrum processing by multiplying the transmission symbol group S6 by a PN code, which is generated by an internal Pseudo Noise (PN) code generator (not shown in the figure), and sends a resultant wideband spread signal S7 to an Radio Frequency (RF) circuit 18.

The RF circuit 18 creates a transmission signal by applying filtering processing and digital/analog conversion processing to the wideband spread signal S7, creates a transmission signal S8 with a predetermined frequency channel by converting its frequency and then sends the signal via an antenna 19.

A transmission signal S8 sent from the base station 2 is generally mixed with noise and affected by fading in space. That is, the space in which the transmission signal S8 is propagated can be regarded as equivalent to a transmission path 4, and therefore the transmission signal S8 receives noise from a noise source 21 through an adder 22 in an addition form and receives influences from a fading source 23 through a multiplier 24 in a multiplication form during propagation.

In this way, the transmission signal S8 that has propagated through the transmission path 4 is received by an antenna 31 (FIG. 1) of the cellular phone 3 as a transmission signal S9 affected by noise and fading.

(1-2) Configuration of Cellular Phone

Figure 4:
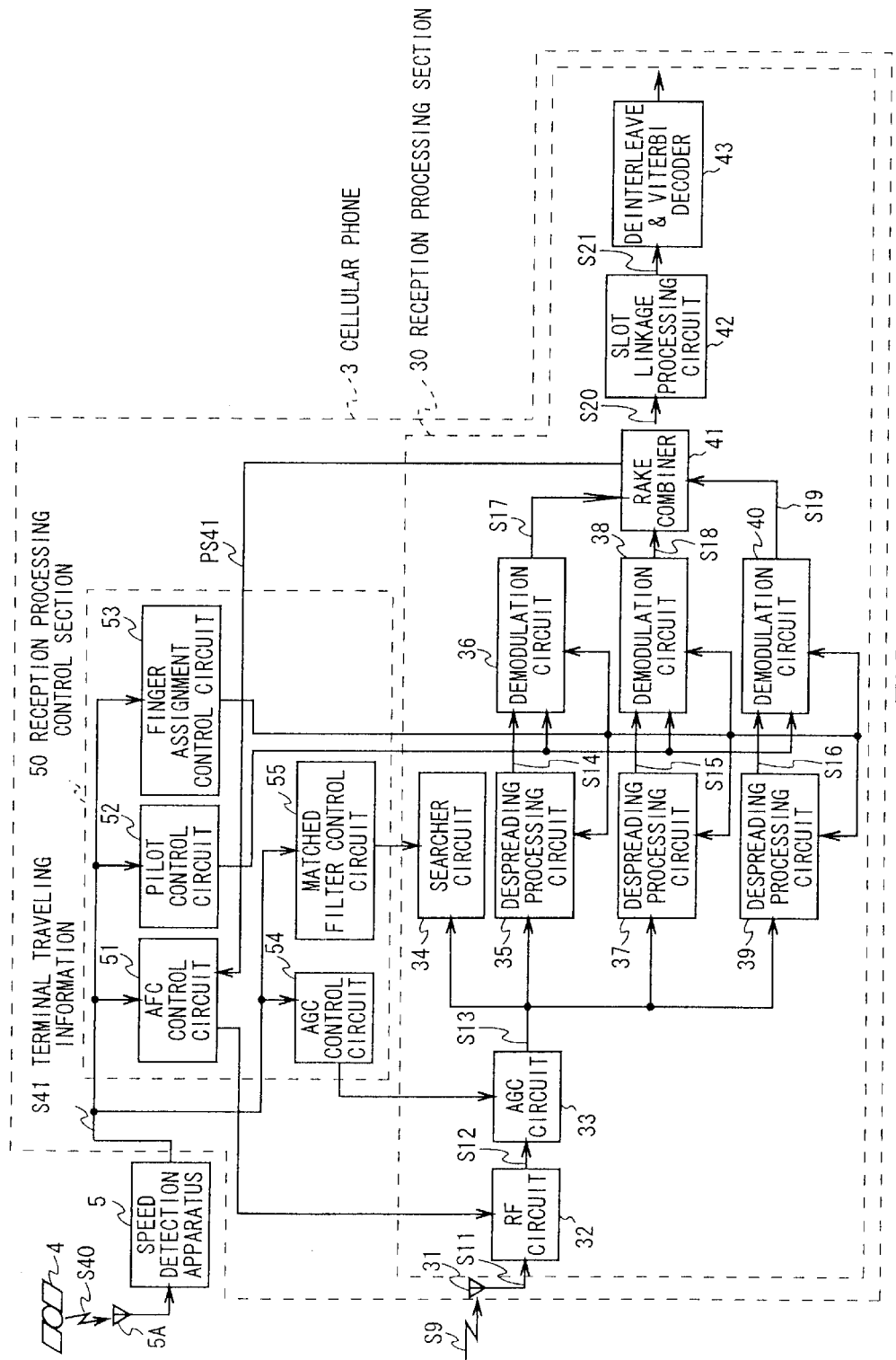
FIG. 4 is a block diagram showing a configuration of a cellular phone.

As shown in FIG. 4, the speed detection apparatus 5 connected to the cellular phone 3 receives satellite signals S40 from a plurality of GPS satellites 4 by a built-in antenna 5A, detects the current position by analyzing the satellite signals S40 and calculates the traveling speed of the cellular phone 3 based on the current position and the traveling position after a lapse of a predetermined time.

Then, the speed detection apparatus 5 decides which of the following states the cellular phone 3 is in: stationary, low-speed traveling, medium-speed traveling or high-speed traveling, and supplies terminal traveling information S41, which is traveling speed information showing this decision result, to a reception processing control section 50 of the cellular phone 3.

Here, the stationary state indicated by the terminal traveling information S41 refers to the state in which the cellular phone 3 is completely stationary; low-speed traveling state, traveling at a speed of 10 km/h or below; medium-speed traveling state, traveling at a speed of 50 km/h or below; and high-speed traveling state, traveling at a speed over 50 km/h. By the way, the speed range set in this terminal traveling information S41 illustrates only an example and can be changed arbitrarily.

The reception processing control section 50 of the cellular phone 3 notifies an Automatic Frequency Control (AFC) control circuit 51, a pilot control circuit 52, a finger assignment control circuit 53, Automatic Gain Control (AGC) control circuit 54 and a matched filter control circuit 55 of the terminal traveling information S41 supplied from the speed detection apparatus 5.

On the other hand, the cellular phone 3 inputs a reception signal S11 obtained from the transmission signal S9 via the antenna 31 to an RF, circuit 32 of a reception processing section 30. The RF circuit 32 converts the frequency of the reception signal S11 to a baseband, converts it from analog to digital, and thereby extracts a wideband spread signal S12 corresponding to the aforementioned wideband spread signal S7 and sends this to an Automatic Gain Control (AGC) circuit 33.

The AGC circuit 33 controls so that the amplitude level of the pilot symbol P in the wideband spread signal S12 reaches a predetermined value based on the control by the AGC control circuit 54 of the reception processing control section 50 and sends a resultant wideband spread signal S13 to a searcher circuit 34, despreading processing circuits 35, 37 and 39.

Actually, the AGC control circuit 54 monitors the amplitude level of the pilot symbol P detected by filtering the wideband spread signal S12. using an Infinite Impulse Response (IIR) filter (not shown in the figure) in the AGC circuit 33 and can control the follow-up speed until the amplitude level of the pilot symbol P reaches a predetermined value according to the traveling speed of the cellular phone 3 by adjusting a time constant of the IIR filter according to the terminal traveling information S41 supplied from the speed detection apparatus 5.

That is, when the cellular phone 3 is traveling at a predetermined speed, the fading characteristic changes momentarily, and therefore the AGC control circuit 54 shortens the time constant in the IIR filter of the AGC circuit 33, thereby making the IIR filter operate at a high speed so that the amplitude level of the pilot symbol P reaches a predetermined value in a short time.

On the contrary, when the cellular phone 3 is stationary, the fading characteristic remains stable without changing momentarily, and the AGC control circuit 54 extends the time constant in the IIR filter of the AGC circuit 33, thereby making the IIR filter operate at a low speed so that the follow-up speed until the amplitude level of the pilot symbol P reaches a predetermined value is slow.

As shown above, the AGC control circuit 54 controls the follow-up speed until the amplitude level of the pilot symbol P reaches a predetermined value according to the terminal traveling information S41 supplied from the speed detection apparatus 5, making it possible to always adjust the amplitude level of the pilot symbol P to an optimal value in consideration of influences of fading that varies depending on the traveling speed.

Next, the searcher circuit 34 is a matched filter made up of a multiple shift registers connected in parallel and a total adder and calculates a correlation value by multiplying the local PN code and wideband spread signal S13 in parallel while shifting the phase of the local PN code generated internally and notifies despreading processing circuits 35, 37 and 39, and demodulation circuits 36, 38 and 40 of the time at which a peak of the correlation value is obtained as the timing of acquiring synchronization.

This makes the despreading processing circuits 35, 37 and 39 and demodulation circuits 36, 38 and 40 start despreading processing and demodulation processing based on the timing notified from the searcher 34.

At this time, the matched filter control circuit 55 adjusts a search time when the searcher circuit 34 calculates a correlation value according to the terminal traveling information S41 supplied from the speed detection apparatus 5.

That is, since a fading characteristic changes momentarily while the cellular phone 3 is moving at a predetermined speed, the matched filter control circuit 55 shortens the search time by shortening the time constant of the filter (not shown in the figure) provided inside the searcher circuit 34 and restricting the band of the wideband spread signal S13 used to calculate the correlation value, instead of calculating the correlation value using all chips of the wideband spread signal S13.

On the other hand, since the fading characteristic does not change momentarily and remains stable when the cellular phone 3 is stationary, the matched filter control circuit 55 extends the search time by extending the time constant of the filter of the searcher circuit 34 without restricting the band of the wideband spread signal S13 used to calculate the correlation value.

This allows the matched filter control circuit 55 to control the search time until the correlation value is calculated by the searcher circuit 34 according to the terminal traveling information S41 supplied from the speed detection apparatus 5 and optimally perform synchronization acquisition processing in consideration of influences of fading that varies depending on the traveling speed.

The despreading processing circuits 35, 37 and 39 are each supplied with the wideband spread signal S13 with different paths from the AGC circuit 33, perform despreading processing on their respective signals, and thereby create the reception symbol groups S14, S15 and S16 corresponding to the transmission symbol group S6 (FIG. 3) created by the base station 2 and send these symbol groups to demodulation circuits 36, 38 and 40.

Demodulation circuits 36, 38 and 40 perform QPSK demodulation processing on the reception symbol groups S14, S15 and S16 and send resultant coding bit groups S17, S18 and S19 to the RAKE combiner 41.

Here, a combination of the despreading processing circuit 35 and the demodulation circuit 36 is normally called a "finger circuit" and the reception processing section 30 of the cellular phone 3 in this embodiment is provided with, for example, 3 sets of finger circuit for multi-paths.

However, the transmission signal S9 that has arrived at the cellular phone 3 via various multi-paths also includes data that cannot be fully demodulated, and therefore it is necessary to switch paths assigned to each finger circuit in a predetermined cycle.

Thus, the finger assignment control circuit 53 controls in such a way that paths assigned to the finger circuits made up of combinations of the despreading processing circuit 35 and demodulation circuit 36, the despreading processing circuit 37 and demodulation circuit 38 and the despreading processing circuit 39 and demodulation circuit 40 are switched one by one in a predetermined cycle according to the terminal traveling information S41 supplied from the speed detection apparatus 5.

That is, when the cellular phone 3 is traveling at a predetermined speed, the multi-path state changes momentarily, and therefore the finger assignment control circuit 53 controls so that a path assigned to each finger circuit is switched in a short cycle.

On the other hand, when the cellular phone 3 is stationary, the multi-path state is also stable, and therefore the finger assignment control circuit 53 controls so that a path assigned to each finger circuit is switched in a long cycle.

In this way, the finger assignment control circuit 53 controls the cycle of switching paths assigned to the finger circuits according to the terminal traveling information S41 supplied from the speed detection apparatus 5, and is thereby designed to be able to perform despreading processing and demodulation processing according to the multi-path state pursuant to the traveling speed and thereby ensure data demodulation.

On the other hand, the demodulation circuits 36, 38 and 40 perform channel estimation by deciding whether the demodulation results of the pilot symbol P in the reception symbol groups S14, S15 and S16 show phase shifts and amplification shifts due to fading.

The demodulation circuits 36, 38 and 40 examine the demodulation results of the pilot symbol P and in the case where there are any phase shifts and amplitude shifts with respect to a predetermined reference phase and reference amplitude, return the demodulation result of the information symbol I that follows the pilot symbol P by the phase shift and amplitude shift and send this to the RAKE combiner 41 as the coding bit groups S17, S18 and S19.

At this time, the pilot control circuit 52, according to the terminal traveling information S41 supplied from the speed detection apparatus 5, adjusts, for example, the time constants of the pilot reception filters (not shown in the figure) made up of an IIR filter provided inside the demodulation circuits 36, 38 and 40, and can thereby control the number of pilot symbols P used to detect phase shifts or amplitude shifts via the pilot reception filters.

That is, when the cellular phone 3 is traveling at a predetermined speed, the fading characteristic changes momentarily, and therefore the pilot control circuit 52 shortens the time constants of the pilot reception filters in the demodulation circuits 36, 38 and 40, reduces the number of pilot symbols P used during detection and thereby detects phase shifts and amplitude shifts in a short time.

This is to prevent cases where when the number of pilot symbols P is increased, even pilot symbols P of past reception slots spanning a plurality of reception slots may be used, resulting in erroneous detection of phase shifts and amplitude shifts due to fading in the past in addition to phase shifts and amplitude shifts due to current fading.

On the other hand, when the cellular phone 3 is stationary, the fading characteristic is stable without changing momentarily, and therefore the pilot control circuit 52 extends the time constants of the pilot reception filters in the demodulation circuits 36, 38 and 40. In this way, the pilot control circuit 52 increases the number of pilot symbols P used during detection, and thus can average and detect accurately phase shifts and amplitude shifts caused by noise.

As shown above, the pilot control circuit 52 can accurately detect phase shifts and amplitude shifts by the demodulation circuits 36, 38 and 40 in consideration of influences of fading that varies depending on the traveling speed by controlling the time constants of the pilot reception filters in the demodulation circuits 36, 38 and 40 according to the terminal traveling information S41 supplied from the speed detection apparatus 5.

The RAKE combiner 41 combines the coding bit groups S17, S18 and S19 supplied from the demodulation circuits 36, 38 and 40 with arriving time phase shifts over time due to multi-paths synchronized and sends a resultant coding bit group S20 to a slot linkage processing circuit 42.

On the other hand, the RAKE combiner 41 recognizes phase shifts caused by fading from the demodulation result obtained by demodulating the pilot symbol P by the demodulation circuits 36, 38 and 40 and sends this phase shift information PS41 to the AFC control circuit 51 of the reception processing control section 50.

The AFC control circuit 51 controls the reception frequency of the reception signal S11 received by the RF circuit 32 based on the terminal traveling information S41 supplied from the speed detection apparatus 5 and phase shift information PS41 supplied from the RAKE combiner 41.

Here, the RF circuit 32 generates a reference clock synchronized with the base station 2 based on the reception frequency of the reception signal S11, but because the transmission signal S8 sent from the base station 2 is converted to the transmission signal S9 with a phase shift due to fading on the transmission path 4 and received as the reception signal S11, the base station 2 becomes asynchronous with the cellular phone 3.

However, since fading can occur at any time, whether the cellular phone 3 is stationary, traveling at a low speed, traveling at a medium speed, traveling at a high speed, a range of frequency differences between the transmission signal S8 sent by the base station 2 and reception signal S11 received by the RF circuit 32 is set for when the cellular phone 3 is stationary, traveling at a low speed, traveling at a medium speed, traveling at a high speed, and if the frequency difference falls within the range, the lock decision of the RF circuit 32 is regarded as correct (if the difference falls within the range, it is decided to be an appropriate reception frequency pursuant to the traveling speed).

Thus, the AFC control circuit 51 recognizes the traveling state of the cellular phone 3 based on the terminal traveling information S41 supplied from the speed detection apparatus 5 and decides at that time whether the phase shift information PS41 supplied from the RAKE combiner 41 is appropriate or not with respect to the traveling state of the cellular phone 3 based on the table that serves as a reference.

Then, in the case where the phase shift information PS41 supplied from the RAKE combiner 41 is decided to be inappropriate with respect to the recognized traveling state of the cellular phone 3, the AFC control circuit 51 adjusts the reception frequency of the reception signal S11 received by the RF circuit 32 through phase control and thereby controls so that the frequency difference between the transmission signal S8 sent by the base station 2 and the reception signal S11 received by the RF circuit 32 falls within an appropriate range.

By the way, a clock shift due to a slight frequency difference after being fit into an appropriate range is corrected within each finger circuit in the posterior stage and synchronized with the base station 2.

The slot linkage processing circuit 42 is a circuit that links the coding bit group S20 obtained in fragments in slot units so that the coding bit group S20 becomes a continuous signal and stores the coding bit group S20 by the storage capacity of the deinterleave buffer of the deinterleave and Viterbi decoder 43 in the next stage, links the coding bit group S20 and sends a resultant coding bit string S21 to the deinterleave and Viterbi decoder 43.

The deinterleave and Viterbi decoder 43 has a storage capacity for a plurality of slots, sequentially stores the supplied coding bit string S21 in the internal storage area, rearranges the sequence of the coding bit string S21 in the reverse order of the rearrangement performed by the interleave buffer 12 of the base station 2, restores the original order, further considering the trellis of the convolution code, estimates the likeliest state from among all possible state transitions as data (so called likeliest string estimation) and restores the transmitted information bit string S22.

The digital cellular phone system 1 of this embodiment only describes the case of transmission/reception from the base station 2 to the cellular phone 3, that is, in downlink direction. In reality, however, a transmission circuit is also included in the cellular phone 3 and a reception circuit is also included in the base station 2, and therefore normal uplink transmission/reception is also performed from the cellular phone 3 to the base station 2.

(1-3) Optimal Reception Processing Procedure According to Traveling Speed

Figure 5:
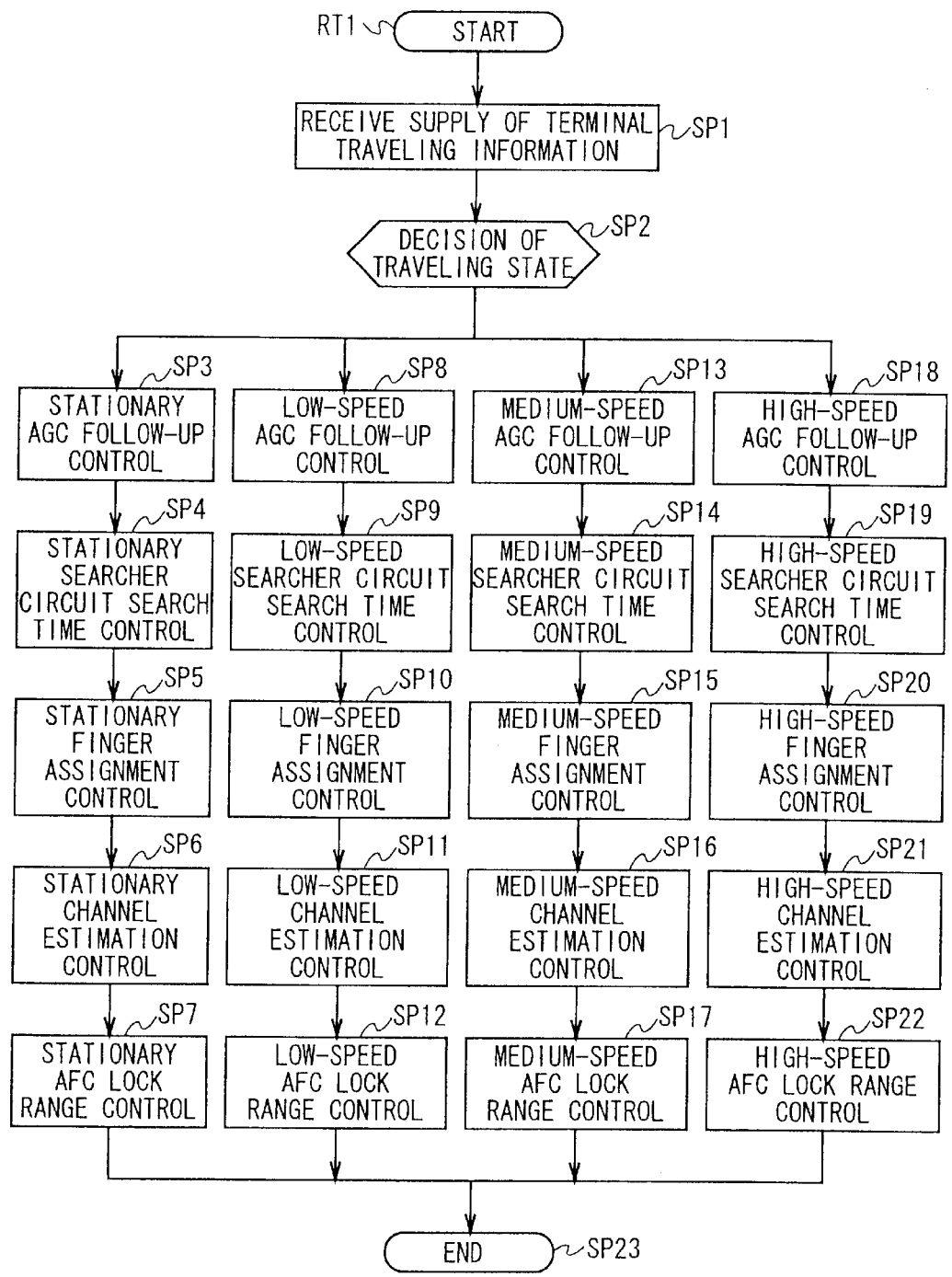
FIG. 5 is a flow chart showing a reception processing procedure according to traveling speed.

Then, an optimal reception processing procedure in the digital cellular phone system 1 in consideration of influences of fading that varies.depending on the traveling speed of the cellular phone 3 will be explained using the flow chart in FIG. 5.

The reception processing control section 50 of the cellular phone 3 starts with a start step of routine RT1 and moves to step SP1. In step SP1, the reception processing control section 50 is supplied with the terminal traveling information S41 from the speed detection apparatus 5 and moves to the next step SP2.

In step SP2, the reception processing control section 50 decides the traveling state (one of stationary, low-speed traveling, medium-speed traveling or high-speed traveling) of the cellular phone 3 based on the terminal traveling information S41 and moves to the next step SP3 if the cellular phone 3 is stationary.

In step SP3, the fading characteristic is stable without changing momentarily when the cellular phone 3 is stationary, and therefore the reception processing control section 50 extends the time constant of the IIR filter of the AGC circuit 33 through control of the AGC control circuit 54, and thereby slowly controls the follow-up speed until the amplitude level of the pilot symbol P reaches a predetermined value and moves to the next step SP4.

In step SP4, the fading characteristic is stable without changing momentarily when the cellular phone 3 is stationary, and therefore the reception processing control section 50 extends the time constant of the filter of the searcher circuit 34 through control of the matched filter control circuit 55 and thereby controls so that a search time for calculating a correlation value is extended and moves to the next step SP5.

In step SP5, the multi-path state is stable when the cellular phone 3 is stationary, and therefore the reception processing control section 50 controls so that the path assigned to each finger circuit is switched in a long cycle through control of the finger assignment control circuit 53 and moves to the next step SP6.

In step SP6, the fading characteristic is stable without changing momentarily when the cellular phone 3 is stationary, and therefore the reception processing control section 50 extends the time constant of the pilot reception filters inside the demodulation circuits 36, 38 and 40 through control of the pilot control circuit 52 so that the number of pilot symbols P used for channel estimation detection of phase shifts and amplitude shifts) is increased and moves to the next step SP7.

In step SP7, the fading characteristic is stable without changing momentarily when the cellular phone 3 is stationary, and therefore the reception processing control section 50 controls so that the lock decision range is narrowed according to the phase shift information PS41 from the RAKE combiner 41 through control of the AFC control circuit 51 and moves to the next step SP23 and ends the reception processing.

On the other hand, in the case where it is decided in step SP2 that the traveling state of the cellular phone 3 is, for example, high-speed traveling state, the process moves to the next step SP18.

In step SP18, when the cellular phone 3 is traveling at a high speed, the fading characteristic changes momentarily and is unstable, and therefore the reception processing control section 50 shortens the time constant of the IIR filter of the AGC circuit 33 through control of the AGC control circuit 54, controls so as to speed up the follow-up speed until the amplitude level of the pilot symbol P reaches a predetermined value and moves to the next step SP19.

In step SP19, when the cellular phone 3 is traveling at a high speed, the fading characteristic changes momentarily and is unstable, and therefore the reception processing control section 50 shortens the time constant of the filter of the searcher circuit 34 through control of the matched filter control circuit 55, controls so as to shorten the search time when a correlation value is calculated.and moves to the next step SP20.

In step SP20, when the cellular phone 3 is traveling at a high speed, the multi-path state is unstable, and therefore the reception processing control section 50 controls so that the path assigned to each finger circuit is switched in a short cycle through control of the finger assignment control circuit 53, and moves to the next step SP21.

In step SP21, when the cellular phone 3 is traveling at a high speed, the fading characteristic is changed momentarily and unstable, and therefore the reception processing control section 50 shortens the time constants of the pilot reception filters inside the demodulation circuits 36, 38 and 40 through control of the pilot control circuit 52,controls so that the number of pilot symbols P used for channel estimation (detection of phase shifts and amplitude shifts) and moves to the next step SP22.

In step SP22, when the cellular phone 3 is traveling at a high speed, the fading characteristic is changed momentarily and unstable, and therefore the reception processing control section 50 controls so that the lock decision range is expanded according to the phase shift information PS41 from the RAKE combiner 41 through control of the AFC control circuit 51 and moves to the next step SP23 and ends the reception processing.

Likewise, in the case where it is decided in step SP2 that the traveling state of the cellular phone 3 is, for example, low-speed traveling or medium-speed traveling, the process moves to SP8 to step SP12 and step SP13 to step SP17, respectively and performs reception processing according to the traveling speed.

(2) Action and Effect of Embodiment

In the above configuration, the digital cellular phone system 1 receives and analyzes the satellite signal S40 from the GPS satellite 4 through the speed detection apparatus 5, calculates the traveling speed of the cellular phone 3, decides which state the cellular phone 3 is in: stationary, low-speed traveling, medium-speed traveling or high-speed traveling, based on the calculated traveling speed and supplies the terminal traveling information S41, the decision result, to the cellular phone 3 as the reception apparatus.

The cellular phone 3 recognizes the traveling state of itself based on the terminal traveling information S41 supplied from the speed detection apparatus 5, controls various kinds of reception processing by the RF circuit 32, AGC circuit 33, searcher circuit 34, despreading processing circuits 35, 37 and 39 and demodulation circuits 36, 38 and 40 of the reception processing section 30 according to the traveling state, and can thereby perform reception processing suited to influences of fading that varies depending on the traveling speed and the state of the transmission path.

According to the configuration above, the cellular phone 3 recognizes the traveling state of itself based on the terminal traveling information S41 supplied from the speed detection apparatus 5, performs optimal reception processing according to the traveling state and can thereby compensate the deterioration of transmission quality and further improve the reception characteristic.

(3) Other Embodiments

The above embodiment describes the case where the cellular phone 3 is connected to the speed detection apparatus 5 so that the speed detection apparatus 5 supplies the terminal traveling information S41 to the cellular phone 3, but the present invention is not limited to this and it is also possible to incorporate the speed detection apparatus 5 in the cellular phone 3 to form a one-body structure.

Moreover, the above embodiment describes the case where the transmission symbol group S6 generated by adding the pilot symbol P at the beginning of the information symbol I is sent through a predetermined channel, but the present invention is not limited to this and it is also possible to send the information symbol I and pilot symbol P through different channels.

Figure 6:
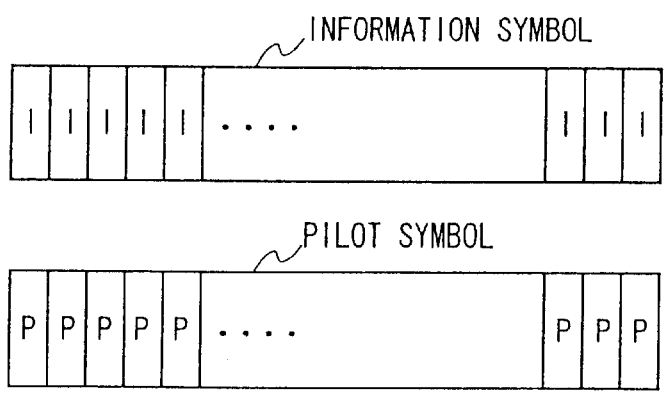
FIG. 6 is a schematic diagram showing a slot format of another embodiment.

In this case, as shown in FIG. 6, the information channel through which the information symbol I is transmitted is different from the pilot channel through which the pilot symbol P is transmitted, but these symbols are transmitted in synchronization with one another, and therefore there is no time difference between the information symbol and pilot symbol P. This allows the cellular phone 3 to perform reception processing on the reception signals of both channels simultaneously and demodulate the information symbol and pilot symbol P simultaneously, making it possible to further improve the accuracy in obtaining the demodulation result of the information symbol.

Furthermore, the above embodiment describes the case where the reception processing control section 50 performs AFC control, pilot control, finger assignment control, AGC control and matched filter control as the reception processing control, but the present invention is not limited to this and it is also possible to allow the reception processing control section 50 to control other various kinds of reception processing.

Furthermore, the above embodiment describes the case where reception processing is controlled according to the terminal traveling information 41 which specifies the traveling state divided into four levels: stationary, low-speed traveling, medium-speed traveling and high-speed traveling, but the present invention is not limited to this and it is also possible to control reception processing by dividing the traveling state into finer speed levels.

Furthermore, the above embodiment describes the case where the speed detection apparatus 5 is used as the speed detection means for detecting the traveling speed based on a satellite signal from the GPS satellite 4, but the present invention is not limited to this and it is also possible to use various kinds of speed detection means such as an acceleration sensor.

As described above, according to the present invention, when a transmission signal sent via a radio transmission path is received and data is demodulated by carrying out various kinds of reception processing on the received signal, it is possible to perform reception processing best suited to a radio transmission path whose state changes according to the traveling speed of the terminal itself, compensate the deterioration of transmission quality independently of the traveling speed and improve the reception characteristic by receiving traveling speed information from the speed detection means that detects the traveling speed of the terminal itself and controlling reception processing on the reception signal according to the traveling speed information.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A moveable reception apparatus for receiving a transmission signal including a pilot symbol to detect a phase variation sent via a radio transmission path, and including an automatic gain control circuit for controlling an amplitude level of a received signal, and for demodulating data by applying reception processing to a received signal, said apparatus comprising:

reception processing means for receiving said transmission signal, for applying said reception processing to said received signal, and for demodulating data of the processed received signal;

speed detecting means for detecting a traveling speed of said moveable reception apparatus to generate traveling speed information;

controlling means receiving said traveling speed information from said speed detecting means for controlling said reception processing by said reception processing means according to said traveling speed information; and an automatic gain control circuit control circuit for monitoring an amplitude level of the pilot symbol detected by a filter in the automatic gain control circuit to control a follow-up speed until the amplitude level of the pilot symbol reaches a predetermined value by adjusting a time constant of the filter according to the traveling speed information.

2. The reception apparatus according to claim 1, wherein said controlling means controls a number of the pilot symbols used to detect a phase variation in response to said traveling speed information.

3. The reception apparatus according to claim 1, wherein said controlling means controls in response to said traveling speed information a range of deciding a frequency difference between a frequency of said reception signal affected by fading over said radio transmission path and a reference frequency.

4. The reception apparatus according to claim 1, wherein said reception processing means comprises a plurality of receiving means for receiving a plurality of transmission signals transmitted via a plurality of propagation paths forming said radio transmission path; and said controlling means controls in response to said traveling speed information assignment of said transmission signal to said plurality of receiving means in a predetermined cycle.

5. The reception apparatus according to claim 1, wherein said reception processing means comprises correlation detecting means for receiving said transmission signal which is spread-spectrum-processed using a pseudo noise code and for calculating a correlation value for said received signal; and said controlling means controls in response to said traveling speed information a search time for calculating said correlation value by said correlation detecting means.

6. The reception apparatus according to claim 5, wherein said controlling means controls in response to said traveling speed information said search time by adjusting a time constant of a filter provided in said correlation detecting means.

7. A reception processing method for receiving a transmission signal including a pilot symbol to detect a phase variation sent via a radio transmission path and for demodulating data by applying reception processing to said received transmission signal, said method comprising the steps of:

receiving said transmission signal;

performing an automatic gain control by controlling an amplitude level of a received signal;

applying said reception processing to said received transmission signal and thereby demodulating data thereof;

detecting a traveling speed of a terminal apparatus performing said reception processing;

controlling said reception processing in response to said traveling speed detected in said step of detecting; and controlling said step of performing an automatic gain control by monitoring an amplitude level of the pilot symbol detected by a filter used in said step of performing an automatic gain control and controlling a follow-up speed until the amplitude level of the pilot symbol reaches a predetermined value by adjusting a time constant of the filter according to the traveling speed detected in said step of detecting.

8. The reception processing method according to claim 7, wherein the step of controlling in response to said traveling speed information includes controlling a number of the pilot symbols used to detect a phase variation.

9. The reception processing method according to claim 7, wherein the step of controlling in response to said traveling speed information includes controlling a range of deciding a frequency difference between a frequency of said received transmission signal affected by fading over said radio transmission path and a reference frequency.

10. The reception processing method according to claim 7, wherein the step of controlling in response to said traveling speed information includes controlling an assignment of said transmission signal to a plurality of receivers for receiving a plurality of transmission signals transmitted via a plurality of propagation paths forming said radio transmission path in a predetermined cycle.

11. The reception processing method according to claim 7, further comprising the step of receiving said transmission signal which is spread-spectrum-processed using a pseudo noise code and calculating a correlation value for said received signal, wherein a search time for calculating said correlation value is controlled in response to said traveling speed detected in said step of detecting.

12. The reception processing method according to claim 11, wherein the step of controlling response to said traveling speed information includes adjusting said search time by a time constant of a filter used for calculating said correlation value.

* * * * *